Dec. 18, 1956   E. W. PARLASCA   2,774,540
AUTOMOBILE THERMOSTAT
Filed Feb. 2, 1951
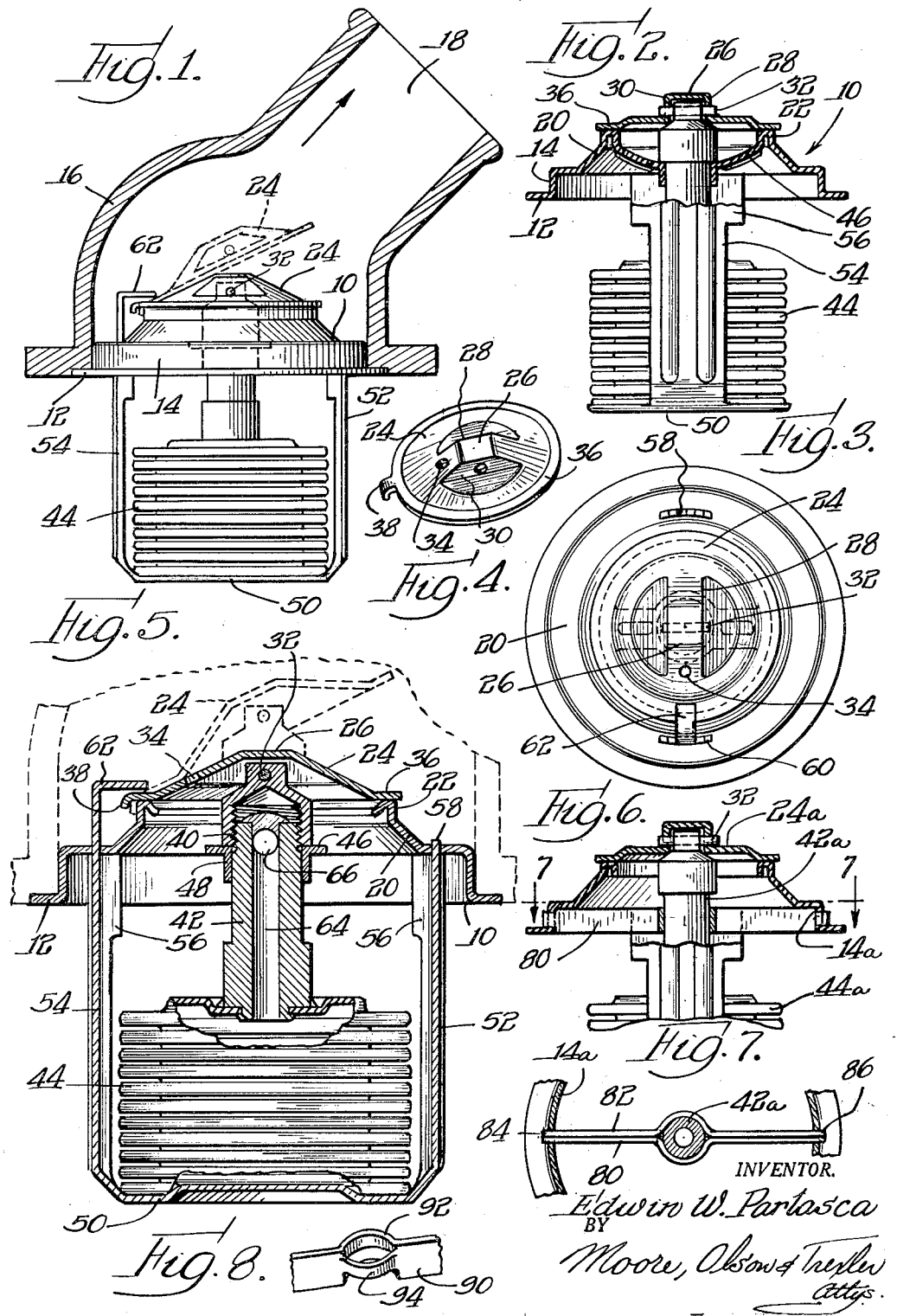
INVENTOR.
Edwin W. Parlasca
BY
Moore, Olson & Trexler
attys.

United States Patent Office 2,774,540
Patented Dec. 18, 1956

2,774,540
AUTOMOBILE THERMOSTAT

Edwin W. Parlasca, Elgin, Ill., assignor to Flexonics Corporation, a corporation of Illinois Application February 2, 1951, Serial No. 209,053

10 Claims. (Cl. 236—34)

This invention relates to thermostats for internal combustion engines, and concerns particularly thermostats of the type used in automobiles, trucks, and the like.

Thermostats are employed in the internal combustion engines of automotive vehicles, for controlling the flow of cooling water within the engine, selectively to the radiator, in accordance with desired temperature conditions. Particularly in engines of more recent design, producing greater power, it is necessary that the thermostat exhibit a reliable degree of tightness, when closed, while at the same time permitting a high flow rate when in fully open position. These results must be accomplished without undue cost, or undue size, in the thermostat structure.

Valves in conventional thermostat structures are commonly of two types, viz., poppet valves, or butterfly throttle type valves. The poppet valve has the advantage that when closed it may be made relatively tight and reliable, but when open it does not exhibit the desired flow rate, particularly when associated with the connected cooling passages of the engine, which frequently must be of a particular type and kind in accordance with engine design requirements. The butterfly type valve generally exhibits a higher flow rate, but has the disadvantage that when closed it is not reliable, and under pressure may exhibit exorbitant and unpredictable leakage characteristics.

The provision of other types of pivoted control valves, generally, does not effect a complete and satisfactory solution to the problem, due to the fact that they may exhibit, to a greater or lesser degree, certain of the disadvantages mentioned above.

In accordance with the present invention, a thermostat control valve structure is provided, as hereinafter as specifically described, which is tight and reliable when in closed position, which exhibits a high flow rate when open, in association with the engine cooling passages, and which can be economically fabricated and produced.

It is accordingly an object of the present invention to provide an internal combustion engine control thermostat, of improved construction and improved operating characteristics.

More specifically stated, it is an object of the invention to provide an improved automobile thermostat which is reliable and leakproof when closed, which has a high flow rate when open, and when connected to the associated engine passages, and which may be reliably and economically fabricated and produced.

It is a further object of the invention to provide an improved control valve, for automotive thermostats of the type defined, which exhibits the characteristics of a poppet valve, when closed, but which produces a minimum of turbulence and back pressure, in connection with associated engine cooling passages, when in open position.

Various other objects, advantages and features of the invention will be apparent from the following specification, when taken in connection with the accompanying drawings, wherein certain preferred embodiments are set forth for purposes of illustration.

In the drawings, wherein like reference numerals refer to like parts throughout:

Fig. 1 is an assembly view of an automotive thermostat and associated engine structure installation, the thermostat being constructed in accordance with and embodying the principles of the present invention;

Fig. 2 is a view of the thermostat structure, shown in side elevation as in Fig. 1, but with the thermostat structure displaced 90°;

Fig. 3 is a plan view of the thermostat shown in Figs. 1 and 2;

Fig. 4 is a perspective detail of the control valve;

Fig. 5 is a view similar to Fig. 1, on an enlarged scale, and showing certain of the thermostat parts in section;

Fig. 6 is a view like Fig. 2 but illustrating a modified form of valve stem guide structure;

Fig. 7 is a detail view of the structure of Fig. 6 taken as indicated by the line 7—7 thereof; and Fig. 8 is a partial perspective view of a still further modified form of stem guide, usable in the structure of the invention.

Referring more particularly to the drawings, and first to the embodiment illustrated in Figs. 1–5, the structure shown comprises a casing 10 having horizontal and vertical flange portions 12 and 14, respectively, Fig. 2, by means of which the casing may be secured to the associated structure 16 of an internal combustion engine. As will be understood, the structure 16 defines a passage 18, leading to the engine radiator or other suitable point of delivery, which flow passage is adapted for control by the thermostat structure, presently to be described.

The casing 10 further includes an inwardly and upwardly extending portion 20, the upper end of which defines an annular valve seat 22. A valve 24 cooperates with this valve seat, the detail shaping of the valve being best shown in Fig. 4. It will be seen that the valve comprises a crown section 26 having oppositely disposed vertically depending side walls 28 and 30 into which is press-fitted a pivot pin 32. The crown portion of the valve is provided at one point thereon with a controlled leakage opening 34, the purpose of which, as will be understood, is to permit a predetermined flow through the valve, for safety purposes, when the valve is in closed position. The valve further comprises a flat peripheral annular section 36 cooperable with the valve seat 22 when the valve is in closed position, said peripheral portion having at one point thereon an extending pivot tab 38.

Operating means is provided for the valve comprising a cap-like member 40 pivotally mounted upon the central portion of pivot pin 32, this cap member being threadedly secured to the upper end of a valve operating stem 42, the lower end of which is suitably secured to a flexible metallic bellows 44. A stem guide 46 extends across the casing opening defined by the valve seat 22, this stem guide having at its central portion a depending circular flange 48 forming a guide for the valve stem slidable therein. The stem guide 46 is formed as an integral extension of the valve seat 22, so that the flange portion 48 thereof may be die formed simultaneously with the valve seat, for accurate correlation of the parts.

The bellows 44 is supported at its lower end by the platform portion 50 of a U-shaped bellows support strap, the legs 52 and 54 of which are staked at their upper ends to the support casing 10. The platform 50 is substantially circular and is hermetically sealed to the bellows at its lower end. The legs 52 and 54 are somewhat widened at their upper ends, as indicated at 56, reduced sections 58 and 60 of said widened portions being projected through the casing 10 and staked thereto. Strap leg 54 has a further reduced portion 62 extending upwardly and laterally so as to form part of a hinge connection for the valve, and the projecting tab portion 38 thereof.

Referring further to the valve stem 42, it will be seen that the stem incorporates a central passage 64 communicating with the interior of the bellows, the upper end of the passage being sealed by a ball 66 and associated solder plug.

In the assembly of the structure, the bellows is first assembled and sealed to its support strap and to the valve stem 42, after which the passage 64 is sealed by driving the ball 66 into place, and applying the solder plug. The bellows strap is then applied to the casing 10 and staked in position. Thereafter cap member 40 may be mounted on the valve stem and rotatably adjusted to a proper desired position, and then secured in place as by soldering or the like. Upon assembly of the valve and the pin 32, the assembly is complete, and as previously noted, the pivot pin 32 rotates in the cap member but has a drive fit through the side walls 28 and 30 of the valve so as to produce a fluid-tight connection in so far as concerns possible leakage through the valve member.

It will be seen that the valve 24, when in closed position, has the true characteristics of a poppet valve, viz., it in effect has a free floating mounting and is bodily and axially drawn by the contraction of the bellows firmly onto the annular valve seat 22, so as to provide a fluid-tight joint resistant to leakage so long as pressures beyond the strength of the bellows are not applied. Leakage occurs through the opening 34, but such leakage, where desired, is at a controlled and calculated rate. Throughout the life of the structure, and substantially regardless of wear, the poppet valve 24 will close tightly upon its seat when the bellows operates to move the valve to its closed position.

It will further be seen that parts 38 and 62 permit a relative lateral motion between the parts, so that as valve 24 moves open the valve stem 42 may shift freely vertically upwardly, as shown in Fig. 5, or otherwise as the nature of the contact between the valve and its seat and the resiliency of the bellows may dictate.

While the connection provided by the valve tab 38 and the leg extension 62 forms a loose hinge connection, of a kind, it will be seen that this is not the usual pivot connection which may permit fluid leakage through the pivot parts. The connection 38—62 in no way restricts or interferes with the free movement of the valve 24 into its proper seated position in engagement with the valve seat 22. In other words, as stated, the valve when closed has the true characteristics of a poppet valve, free from the restricting influences of pivot connections and the like.

On the other hand, when open, as shown in dotted lines in Figs. 1 and 5, the valve assumes the position of a clam shell, and effects a fluid flow through the passage 18 with a minimum of turbulence and back pressure, and resultingly with a maximum desired flow rate. It has been found that a poppet valve, when opening in the nature of a conventional poppet valve, and when in association with an overhead flow passage such, for example, as indicated at 16, produces a high turbulence and back pressure. This unduly restricts flow through the valve, when in open position, so that desired flow rates cannot be produced substantially regardless of how widely attempt may be made to open the valve. The turbulence creates a flow restricting back pressure even though the valve remains widely open, so that expedients designed to insure and maintain a wide opening are ineffective.

In Figs. 6 and 7 a modified embodiment is illustrated which incorporates a different form of guide for the valve stem, as may in some instances be desired. In the structure shown, in association with the bellows 44a, valve stem 42a, and valve member 24a, all operating as previously described, there is provided a stem guide in the form of a pair of cross struts 80 and 82, staked at their opposite ends 84 and 86 to the flange portion 14a of the main casing. At their center portions the struts 80 and 80a are shaped to provide an annular guide bearing for the valve stem. The construction operates in the same manner as previously described.

In Fig. 8 a still further modification for the stem guide is illustrated, the stem guide in this instance comprising a single strut member 90 bridging and staked to the casing wall surfaces, as described with reference to Figs. 6 and 7, but the single strut member in this instance being provided with oppositely formed portions 92 and 94 for the reception of the valve stem, and to effect the guiding thereof.

It is obvious that various changes may be made in the specific embodiments set forth, without departing from the spirit of the invention. The invention is accordingly not to be limited to the particular structures shown and described, but only as indicated in the following claims.

The invention is hereby claimed as follows:

1. A thermostat for internal combustion engines comprising a casing having an opening defining a valve seat, a thermostatic bellows carried by the casing, a valve cooperable with said seat, said valve being mounted for bodily generally axial movement when it is adjacent its closed position, a valve stem connected to the bellows and having a terminal end portion disposed substantially at said valve seat, the valve and said terminal end portion of said valve stem being pivotally interconnected for relative pivotal movement about an axis extending transversely of said valve stem, and means for tilting said valve about said axis after said valve has begun an opening movement.

2. A thermostat for internal combustion engines comprising a casing having an opening defining a valve seat, a thermostatic bellows carried by the casing, a valve cooperable with said seat, a valve stem interconnecting the bellows and the valve, the valve and valve stem being pivotally interconnected, and an abutment on the casing and spaced away from said valve when the valve is seated and engageable with the valve as it moves to open position, whereby to effect a pivotal shifting between the valve and the valve stem upon the opening movement thereof.

3. A thermostat for internal combustion engines comprising a casing having an opening defining a substantially annular valve seat, a thermostatic bellows carried by the casing and disposed at one side of said valve seat, a valve mounted for bodily axial and pivotal movement relative to said seat and disposed at the opposite side of said seat, and operating means for the valve, said operating means comprising a valve stem connecting with the bellows and having an end portion extending through the opening of said valve seat, said valve stem end portion being pivotally interconnected with the valve, and means for tilting said valve after said valve has begun an opening movement.

4. A thermostat for internal combustion engines comprising a casing having an opening defining a valve seat, a thermostatic bellows carried by the casing, a valve cooperable with said seat, said valve being free and unattached with respect to the casing so as to be bodily and generally axially engageable with the valve seat, a valve stem interconnecting the bellows and the valve, the valve and valve stem being piotally interconnected, and an abutment on the casing engageable with the valve as it moves to open position, whereby to effect a pivotal movement between the valve and the valve stem upon the opening moement thereof.

5. A thermostat for internal combustion engines comprising a casing having an opening defining a valve seat, a valve positioned for cooperation with said seat, a thermostatic bellows carried by the casing, a valve stem having one end fixed to the bellows and an opposite end disposed substantially at said valve seat and pivotally connected to said valve for effecting the pivotal and axial operation of the valve upon the movement of the bellows, said valve being attached only to said valve stem and having the periphery thereof free, and means for pivoting said valve after said valve has begun an opening movement.

6. A thermostat for internal combustion engines comprising a casing having an opening defining a substantially annular valve seat, a valve cooperable with said seat and mounted thereon as a poppet valve when in closed position, a thermostatic bellows carried by the casing at a side of said valve seat opposite from said valve, and means for effecting pivotal shifting of the valve in its various open positions and generally axial shifting of the valve substantially at its closed position, said means including a valve stem having one end connected to the bellows and an opposite end extending through the valve seat opening and pivotally connected to the valve for correlative movement, said valve being attached to said valve stem and having the periphery thereof free, and means for pivoting said valve after it has begun an opening movement.

7. A thermostat for internal combustion engines comprising a casing having an opening defining a valve seat, a thermostatic bellows carried by the casing, a valve cooperable with said seat, a valve stem interconnecting the bellows and the valve, said valve being mounted so as to be bodily and generally axially pressable into engagement with the valve seat, and an abutment carried by the casing in spaced relation to the valve when in closed position, said abutment being engageable with the valve to effect the pivotal movement thereof upon the actuation of said valve stem in an opening direction.

8. A thermostat for internal combustion engines comprising a casing having an opening defining a valve seat, a valve cooperable with said seat, a U support strap carried by the casing, a thermostatic bellows carried by said strap, said strap having its legs secured to the casing adjacent their free ends, and a valve stem interconnecting the bellows and the valve, one of said legs having a projection engageable with the valve upon opening movement thereof to effect pivotal operation of the valve as said valve stem is shifted.

9. A thermostat for internal combustion engines comprising a casing having an opening defining a valve seat, a thermostatic bellows carried by the casing, a valve cooperable with said seat, said valve being free for bodily generally axial movement when it is adjacent its closed position, said valve comprising a crown portion and depending side walls extending therefrom, a valve stem interconnecting the bellows and the valve, said stem projecting into said crown portion and between said walls, and a pivot pin mounted in said walls and forming a pivotal interconnection between the valve stem and the valve.

10. A thermostat for internal combustion engines comprising a casing having an opening defining a valve seat, a U support strap carried by the casing, a thermostatic hermetically seated bellows carried by the strap, a valve cooperable with said seat, said valve being free for bodily generally axial movement when it is adjacent its closed position, a hollow valve stem connected to and having one end communicating with the interior of the bellows, a cap member threadedly mounted upon said sealed end of the valve stem, a pivot interconnection between said cap member and the valve, and means for tilting said valve after said valve has begun an opening movement.

References Cited in the file of this patent

UNITED STATES PATENTS

| | | |
|---|---|---|
| 538,956 | Evans | May 7, 1895 |
| 717,990 | Harvey | Jan. 6, 1903 |
| 1,678,658 | Thomas et al. | July 31, 1928 |
| 1,982,051 | Golob | Nov. 27, 1934 |
| 2,052,313 | Payne | Aug. 25, 1936 |
| 2,063,436 | Hild | Dec. 8, 1936 |
| 2,142,442 | Giesler | Jan. 3, 1939 |
| 2,222,826 | Ward | Nov. 26, 1940 |
| 2,308,861 | Clifford | Jan. 19, 1943 |
| 2,439,582 | Scheineman | Apr. 13, 1948 |
| 2,532,896 | Dillman | Dec. 5, 1950 |

FOREIGN PATENTS

| | | |
|---|---|---|
| 37,830 | Denmark | Aug. 9, 1927 |
| 457,078 | Great Britain | Nov. 20, 1936 |